UNITED STATES PATENT OFFICE.

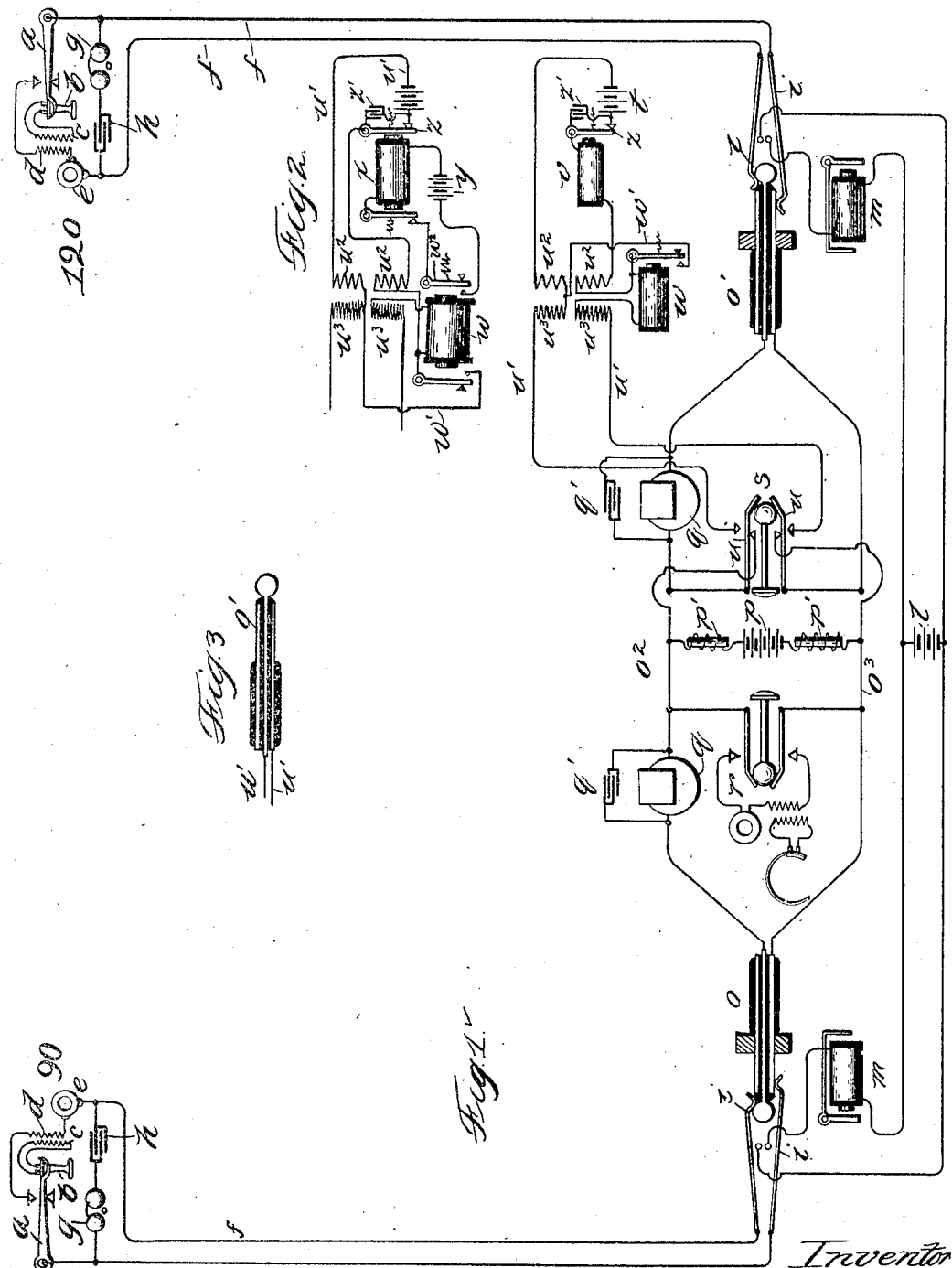

HARRY O. RUGH, OF CHICAGO, ILLINOIS.

TELEPHONE-EXCHANGE SYSTEM.

No. 828,683.

Specification of Letters Patent.

Patented Aug. 14, 1906.

Application filed November 17, 1902. Serial No. 131,697.

*To all whom it may concern:*

Be it known that I, HARRY O. RUGH, a citizen of the United States, residing at Chicago, in the county of Cook and State of Illinois, have invented a certain new and useful Improvement in Telephone-Exchange Systems, of which the following is a full, clear, concise, and exact description, reference being had to the accompanying drawings, forming a part of this specification.

My invention relates to telephone-exchange systems, and has for its object the provision of an improved signaling apparatus at telephone-exchanges, whereby alternating signal-receiving devices, as magneto-bells, can be operated at the substations.

The apparatus of my invention is particularly designed for use in connection with those exchanges where mechanically-operated generators are not desirably employed, the invention enabling me to use a battery whose current is caused to produce alternating or intermittent current for use in signaling.

In practicing my invention I associate with the ringing-key of the cord-circuit (or the switching device that is to afford temporary connection of the signaling source of current with a called line) two conductors leading to contacts adapted to be engaged by the ringing-key, these two conductors including the instrumentality whereby the current that is to be passed over the line for signaling purposes is set up. A battery is a convenient source of current, which battery is included in series with the two conductors leading to the ringing-key contacts. There is also included in the circuit with each of these conductors a primary and a secondary coil, the two primary coils together constituting an inducing winding and the two secondary coils constituting together an induced winding, the coils of each winding, however, being normally in separated relation. The coils of the windings are preferably included normally in series relation with each other, these coils normally not being in transformer relation, and as the conductors are normally open at the ringing-key the battery in circuit with the ringing-key is not wasted when the ringing-key is out of service.

A particular feature of my invention consists in forming the induction-coils and the conductors including the same into inductively-related circuits, to which end the primary coils are directly connected in series, as are also the secondary coils, which result is effected when the ringing-key is operated. The preferred means for effecting this result consists in a relay that is serially included in circuit with the two conductors, the relay being energized upon the manipulation of the ringing-key to operate its armature that serves when attracted to directly connect the coils of the primary together and the coils of the secondary together.

I have thus provided a telephone system comprising a called-subscriber's line extending from a telephone substation to an exchange, cord connecting apparatus at the exchange, a signaling-circuit section normally disconnected from the called-subscriber's line and including a source of current incapable in itself of operating the called-subscriber's signal-receiver, a ringing-key for making this circuit-section a continuation of the called-subscriber's line, and means included in said section for causing the source of current therein to produce current capable of operating the called-subscriber's signal-receiver.

In the preferred embodiment of the invention there is included in the signaling-circuit section a relay, the armature of the relay and its front contact forming part of such section. When the ringing-key is depressed, the circuit through this relay is closed, the armature thereof vibrating to cause an intermittent current in the signaling-section, which intermittent current is transformed because of the operation of the other relay, whose armature serves to transfer the signaling-circuit, now including the called-subscriber's line, into inductively-related sections. The relay that determines the relation between the transformer-coils is desirably not included in that inductive section of the circuit that contains the signaling-battery, but is rather included in that inductive section that contains the subscriber's line, this relay remaining energized by reason of the rapidly-fluctuating current that passes therethrough, this relay being prevented from deënergizing by reason of the sluggishness of its armature as the current from the battery is interrupted.

I will explain my invention more fully by reference to the accompanying drawings, in which—

Figure 1 illustrates one of the many types of telephone-exchange systems to which the invention may be applied. Fig. 2 illustrates a modification of the mechanism employed for interrupting the battery. Fig. 3 illustrates a modification of the apparatus for connecting the signaling-section with the called-subscriber's line.

Like parts are indicated by similar characters of reference in all the views.

I have illustrated merely for the purpose of demonstrating the applicability of my invention one of the many types of telephone-exchange apparatus at each of the substations 90 and 120 whereof I have shown a well-known type of telephone switch-hook $a$, a receiver $b$, supported thereby and shown in this instance as being included in a closed local circuit with the secondary $c$ of an induction-coil, whose primary winding $d$ is shown in series with the transmitter $e$, being adapted for inclusion in series with a telephone-line $ff$ upon the removal of the receiver from its hook. There is also shown at the substation a magneto-bell $g$, desirably of high impedance and resistance, this bell being included in a bridge between the sides of the telephone-line, the said bridge also containing a condenser $h$, as the system illustrated is a common-battery system. The telephone-lines $f$ may terminate in any suitable form of line-jack, as that containing the line-springs $i$. These line-springs are illustrated with back-contacts that normally cause the common battery $l$ to be included in circuit with the telephone-line, which circuit, however, is not complete until the receiver at the corresponding substation is removed from its hook. Between the back-contacts and the common battery there is included a line-signal $m$, preferably of the self-restoring type, there being illustrated in this particular instance a well-known type of line-signal employing a curtain carried by the armature-lever. Other types of line-signals, however, may be employed without departing from the spirit of the invention and other systems than common-battery systems may be used. One of many types of cord-circuits at the exchange is illustrated, that shown employing an answering-plug $o$ and a connecting-plug $o'$, whose tips are united by a tip-strand $o^2$, and whose sleeves are united by a sleeve-strand $o^3$.

The battery indicated at $p$, which, according to well-known telephone practice, may be one and the same with the battery $l$, is bridged across the strands of the cord-circuit, there being included impedance devices $p'$, which will not prevent the passage of battery, but will prevent the shunting of voice-currents.

As forms of clearing-out signals there are illustrated electromagnetic $qq$, similar to the signals $m$, and there is illustrated in shunt about each signal $q$ a condenser $q'$, whose purpose is obvious, these condensers serving to prevent the impedance in the windings of the instruments $q$ from impairing the progress of the voice-currents. There is also illustrated a well-known form of operator's listening-key and listening-outfit $r$. The operation of so much of the telephone-exchange system as has been described by reference to the drawings will be well understood by those skilled in the art without further elucidation.

The ringing-key $s$ may be of the usual type. It is novel in its association, however, in that I am enabled to use in connection therewith a source of constant current, as the battery $t$, with the aid of but two conductors leading to the ringing-key having two contacts $u$, whereby I am enabled to secure a very important advantage, residing in the ability to apply the invention to any standard type of ringing-key mechanism without the provision of additional parts for such mechanism.

The two conductors lettered $u'$ $u'$ are normally in a continuous loop, there being included in each side of the loop the primary coils $u^2$ and the secondary coils $u^3$ of a transformer, the transformer acting in their normal relation merely as parts of the conductors $u'$.

In the form of apparatus illustrated in Fig. 1 there is included in series with the battery $t$ a relay $v$, whose armature, with its front contact, normally maintains the continuity of the conductors $u'$. The circuit containing the conductors $u'$ and the battery $t$ is obviously open when the ringing-key is out of service. When this ringing-key is thrown into service, the circuit including the battery $t$ is closed by way of the ringing-key and the called subscriber's line, whereupon the armature of the magnet $v$ is caused to operate the battery, thereupon producing intermittent current, which is momentarily directly impressed upon the entire circuit, including the called-subscriber's line. When the circuit containing the battery $t$ is thus closed, the relay $w$, included serially in one of the conductors $w'$, preferably between the set of coils $u^2$ $u^3$, is energized, the armature thereof immediately causing the wire $w'$ to unite the coils $u^3$ into a secondary winding and the coils $u^2$ into a primary winding. After the coils are thus united into the windings of the transformer the magnet $w$ is included in that inductive section of the signaling-circuit that contains the coils $u^3$, so that its continued energization is directly dependent upon the ringing-key, the battery $t$ being shunted therefrom, as this battery is contained in the local primary inductive section of the signaling-circuit. The armature of the magnet $w$ is maintained in an attracted position, even though the current through the same fluctuates, by the adjustment of its armature, which is made sluggish with respect to the armature of the relay $v$.

Another form of apparatus is illustrated in Fig. 2, wherein a magnet $x$ is included in a local circuit with a battery $y$, the circuit illustrated being the well-known make-and-break circuit, whereby the armatures of the electromagnet are constantly maintained in vibration.

I have indicated an extra armature z, corresponding to the armature on magnet v.

The advantage of my invention in connection with the modification illustrated in Fig. 2 will be apparent. Circuit is not closed until the relay w, that is employed in the embodiment of the invention illustrated in both figures, is energized upon the depression of the ringing-key. A condenser $z'$ may be employed to overcome the sparks when the circuit containing the battery t is interrupted. The plug o and the ringing-key s constitute a double control of the circuit, including the conductors $u'$, the control effected by the ringing-key s being effected where the plug o is employed, not only as an instrumentality for completing the signaling-circuit through the called subscriber's bell, but is also employed to complete the telephonic connection between the substations. I do not, therefore, wish to be limited to the ringing-key in connection with the cord-circuit performing the double function of establishing signal connections and telephonic connections, as any switching device having separable relation with a called-subscriber's line may be used with my invention. The magnet x is desirably only operated when the signaling-section is thrown into connection with the called-subscriber's line, to which end there may be supplied to the magnet w an extra armature $w^2$, included serially and normally in open circuit with the battery y. When this magnet w is energized, the armature $w^2$ is maintained attracted and is only maintained attracted during the connection of the signaling-section with the called line.

Fig. 3 indicates a plug $o'$, that is purely a ringing-plug, with the tip and sleeve whereof the conductors $u'$ have direct connection, there not being employed in connection with this ringing-plug any "ringing-key," so called.

It is obvious that changes may be made in the apparatus of my invention without departing from the spirit of the invention. I do not, therefore, wish to be limited to the precise arrangement shown; but,

Having thus described my invention, I claim as new and desire to secure by Letters Patent—

1. In a telephone-exchange system, the combination with a telephone-line extending from a substation to an exchange, and provided at its substation with a signal-receiving appliance, a section of a signaling-circuit at the exchange including a source of current and the coils of a transformer, a switching appliance adapted to separably connect the said signaling-section with the said telephone-line, and means included in the signaling-section for establishing transformer relation between the coils of said transformer upon the connection of said signaling-section with the telephone-line, substantially as described.

2. In a telephone-exchange system, the combination with a telephone-line extending from a substation to an exchange, and provided at its substation with a signal-receiving appliance, a section of a signaling-circuit at the exchange, including a source of current and the coils of a transformer, a switching appliance adapted to separably connect the said signaling-section with the said telephone-line, and a relay included in the signaling-section for establishing transformer relation between the coils of said transformer upon the connection of the said signaling-section with the telephone-line, substantially as described.

3. In a telephone-exchange system, the combination with a telephone-line extending from a substation to an exchange, and provided at its substation with a signal-receiving appliance, a section of a signaling-circuit at the exchange, including a source of current and the coils of a transformer, a switching appliance adapted to separably connect the said signaling-section with the said telephone-line, and a relay included between the substation and the secondary of the transformer for establishing transformer relation between the coils of said transformer upon the connection of the said signaling-section with the telephone-line, substantially as described.

4. In a telephone-exchange system, the combination with a telephone-line extending from a substation to an exchange, and provided at its substation with a signal-receiving appliance, a section of a signaling-circuit at the exchange, including a source of direct current and the coils of a transformer, a switching appliance adapted to separably connect the said signaling-section with the said telephone-line, and means for establishing transformer relation between the coils of said transformer upon the connection of the said signaling-section with the telephone-line, and means for alternately modifying the circuit containing the said source of current, substantially as described.

5. In a telephone-exchange system, the combination with a telephone-line extending from a substation to an exchange, and provided at its substation with a signal-receiving appliance, a section of a signaling-circuit at the exchange including a source of direct current, the coils of a transformer, a switching appliance adapted to separably connect the said signaling-section with the said telephone-line, and a relay for establishing transformer relation between the coils of the said transformer upon the connection of the said signaling-section with the telephone-line, and means for alternately modifying the circuit containing the said source of current, substantially as described.

6. In a telephone-exchange system, the combination with a telephone-line extending from a substation to an exchange, and provided at its substation with a signal-receiving appliance, a section of a signaling-circuit at the exchange including a source of direct current and the coils of a transformer, a switching appliance adapted to separably connect the said signaling-section with the said telephone-line, a relay included in the signaling-section for establishing transformer relation between the coils of said transformer upon the connection of the said signaling-section with the telephone-line, and means for alternately modifying the circuit containing the said source of current, substantially as described.

7. In a telephone-exchange system, the combination with a telephone-line extending from a substation to an exchange, and provided at its substation with a signal-receiving appliance, a section of a signaling-circuit at the exchange, including a source of direct current, the coils of a transformer, a switching appliance adapted to separably connect the said signaling-section with the said telephone-line, a relay included between the substation and the secondary of the transformer for establishing transformer relation between the coils of said transformer upon the connection of the said signaling-section with the telephone-line, and means for alternately modifying the circuit containing the said source of current, substantially as described.

8. In a telephone-exchange system, the combination with a telephone-line extending from a substation to an exchange, and provided at its substation with a signal-receiving appliance, a section of a signaling-circuit at the exchange, including a source of direct current and the coils of a transformer, a switching appliance adapted to separably connect the said signaling-section with the said telephone-line, means for establishing transformer relation between the coils of said transformer upon the connection of the said signaling-section with the telephone-line, and means for interrupting the circuit containing the said source of current, the said circuit-interrupter being in the form of an electromagnet having an armature and contact in series relation with each other and the source of the direct current, substantially as described.

9. In a telephone-exchange system, the combination with a telephone-line extending from a substation to an exchange, and provided at its substation with a signal-receiving appliance, a section of a signaling-circuit at the exchange including a source of direct current and the coils of a transformer, a switching appliance adapted to separably connect the said signaling-section with the said telephone-line, and a relay for establishing transformer relation between the coils of said transformer upon the connection of the said signaling-section with the telephone-line, and means for interrupting the circuit containing the said source of current, the said circuit-interrupter being in the form of an electromagnet having an armature and contact in series relation with each other and the source of direct current, substantially as described.

10. In a telephone-exchange system, the combination with a telephone-line extending from a substation to an exchange, and provided at its substation with a signal-receiving appliance, a section of a signaling-circuit at the exchange, including upon each of its opposite sides a primary and a secondary coil, a source of direct current in this signaling-section, a switching appliance for separably connecting this signaling-section with the telephone-line and a relay included in the signaling-section, connections controlled thereby serving to establish transformer relation between the said transformer-coils when the relay is energized, and subdividing the said section into inductively-related primary and secondary portions, the source of direct current being located in the primary portion, and means for alternately modifying the circuit containing the said battery, substantially as described.

11. In a telephone-exchange system, the combination with a telephone-line extending from a substation to an exchange, and provided at its substation with a signal-receiving appliance, a section of a signaling-circuit at the exchange normally serially including transformer-windings, a switching appliance for separably connecting this signaling-section with the telephone-line, and means for establishing a transformer relation between said windings when said section is connected with the telephone-line, substantially as described.

12. In a telephone-exchange system, the combination with a telephone-line extending from a substation to an exchange and provided at its substation with a signal-receiving appliance, a section of a signaling-circuit at the exchange normally serially including transformer-windings, a switching appliance for separably connecting this signaling-section with the telephone-line, and means for establishing a transformer relation between said windings when said section is connected with the telephone-line, a source of direct current in the signaling-section, and means for alternately modifying the circuit containing said source of current, substantially as described.

13. In a telephone-exchange system, the combination with a telephone-line extending from a substation to an exchange and provided at its substation with a signal-receiving appliance, a section of a signaling-circuit at the exchange, normally including transformer-windings, a switching appliance for separably connecting this signaling-section with the telephone-line, and means for establishing a transformer relation between said windings when said section is connected with the telephone-line, substantially as described.

14. In a telephone-exchange system, the combination with a telephone-line extending from a substation to an exchange, and provided at its substation with a signal-receiving appliance, a section of a signaling-circuit at the exchange, a switching appliance for separably connecting this signaling-section with the telephone-line, and means for establishing a transformer relation between said windings when said section is connected with the telephone-line, a source of direct current in the signaling-section and means for alternately modifying the circuit containing said source of current, substantially as described.

In witness whereof I hereunto subscribe my name this 10th day of November, A. D. 1902.

HARRY O. RUGH.

Witnesses:
  GEORGE L. CRAGG,
  A. D. RUSSELL.